(12) United States Patent
Preusser et al.

(10) Patent No.: US 11,005,395 B2
(45) Date of Patent: May 11, 2021

(54) CIRCUIT FOR SELECTIVELY ACTUATING DC MOTORS IN A MOTOR VEHICLE

(71) Applicant: Ford Global Technologies, LLC, Dearborn, MI (US)

(72) Inventors: Lukas Preusser, Cologne (DE); Holger Mueller, Cologne (DE); Ahmet Cinar, Cologne (DE); Denney Vellaramkalayil, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/425,585

(22) Filed: May 29, 2019

(65) Prior Publication Data
US 2019/0372486 A1  Dec. 5, 2019

(30) Foreign Application Priority Data
May 30, 2018  (DE) .......................... 10 2018 208637

(51) Int. Cl.
| *H02P 5/68* | (2006.01) |
| *H02P 7/03* | (2016.01) |
| *E05F 15/616* | (2015.01) |
| *B60R 16/03* | (2006.01) |

(52) U.S. Cl.
CPC ................ *H02P 5/68* (2013.01); *B60R 16/03* (2013.01); *E05F 15/616* (2015.01); *H02P 7/04* (2016.02); *E05Y 2400/42* (2013.01); *E05Y 2900/531* (2013.01)

(58) Field of Classification Search
CPC ......... B60R 18/03; B60R 16/03; B62D 25/10; H02P 5/685; H02P 7/29; H02P 5/68; H02P 7/04; E05F 15/822; E05B 17/22; E05B 47/00; E05B 65/12; E05B 77/26; E05B 81/06; B60N 2/02
See application file for complete search history.

(56) References Cited

U.S. PATENT DOCUMENTS

| 6,583,591 B2* | 6/2003 | Echols ....................... H02P 1/54 318/112 |
| 8,536,821 B2 | 9/2013 | Kamenetz et al. |
| 2007/0075657 A1* | 4/2007 | Moller ....................... H02P 5/68 318/77 |
| 2011/0044669 A1* | 2/2011 | Leon ......................... H02P 5/68 388/829 |

(Continued)

FOREIGN PATENT DOCUMENTS

| DE | 69831398 T2 | 6/2006 |
| DE | 102010052045 A1 | 6/2012 |

*Primary Examiner* — Said Bouziane
(74) *Attorney, Agent, or Firm* — Frank Lollo; Eversheds Sutherland (US) LLP

(57) ABSTRACT

The invention relates to a circuit for selectively actuating drive elements (1, 2), which are operated on direct current, in a motor vehicle by means of half-bridges (4, 5). According to the invention, the circuit is designed for selectively actuating eight drive elements (1, 2) for locking and, respectively, unlocking four doors of the motor vehicle from the outside and/or from the inside. The circuit contains nine half-bridges (4, 5), wherein the outputs of eight of the nine half-bridges (4) are each connected to a first pole of one of the eight drive elements (1, 2) and the output of the ninth half-bridge (5) is connected to all second poles of the eight drive elements (1, 2).

4 Claims, 3 Drawing Sheets

(56) References Cited

U.S. PATENT DOCUMENTS

| | | | | |
|---|---|---|---|---|
| 2013/0342010 A1* | 12/2013 | Nagler | .................. | H02P 5/68 |
| | | | | 307/10.1 |
| 2014/0145666 A1* | 5/2014 | Swanson | ................ | E05B 81/54 |
| | | | | 318/504 |
| 2014/0277938 A1* | 9/2014 | Utter | .................. | E05B 77/48 |
| | | | | 701/36 |
| 2016/0043669 A1* | 2/2016 | Fukuda | .................. | H02P 3/08 |
| | | | | 318/562 |

* cited by examiner

--Prior Art--

--Prior Art--

--Prior Art--

--Prior Art--

--Prior Art--

CIRCUIT FOR SELECTIVELY ACTUATING DC MOTORS IN A MOTOR VEHICLE

CROSS-REFERENCE TO RELATED APPLICATIONS

This application claims priority to and the benefit of German patent application No. 102018208637.0, filed May 30, 2018, which is hereby incorporated by reference herein in its entirety.

The invention relates to circuits for selectively actuating drive elements, which are operated on direct current, in a motor vehicle by means of half-bridges and also to a motor vehicle as claimed in the preambles of the independent patent claims.

Circuits of this kind are known from DE 10 2010 052 045 A1 and US 2011/0044669 A1 and render it possible to manage with less than two half-bridges for each drive element.

In modern door-locking systems for motor vehicles, each door often contains two DC motors, one which, depending on its drive direction, locks or unlocks a handle or any other operating element for opening the door from the outside and one which, depending on its drive direction, locks or unlocks a handle or any other operating element for opening the door from the inside.

In motor vehicles with four or more doors, there is increasingly a desire to be able to lock and unlock, in particular, the four side doors largely independently of one another, specifically in respect of opening from the outside and from the inside. For example, it may be desirable for a specific door to be able to be opened only from the inside but not from the outside, or vice versa, and other locking states may be desired for other doors. For complete flexibility in this respect, sixteen half-bridges would be required in principle when using half-bridges for actuating eight drive elements in four doors, however this number can be reduced, for example to twelve, by circuit optimization, but this still represents considerable expenditure.

The invention is based on the object of being able to control in as flexible a manner as possible eight drive elements for locking and, respectively, unlocking four doors of the motor vehicle from the outside and/or from the inside by means of as small a number of half-bridges as possible.

Said object is achieved by way of the circuits and the motor vehicle having the features of the independent patent claims.

Advantageous developments of the invention are specified in the dependent patent claims.

According to the invention, the circuits are designed for selectively actuating eight drive elements for locking and, respectively, unlocking four doors of the motor vehicle from the outside and/or from the inside.

Here, according to a first aspect of the invention, the circuit contains nine half-bridges, wherein the outputs of eight of the nine half-bridges are each connected to a first pole of one of the eight drive elements and the output of the ninth half-bridge is connected to all second poles of the eight drive elements.

According to a second aspect of the invention, the circuit has six half-bridges, wherein the outputs of four of the six half-bridges are each connected to second poles of each pair of drive elements which are arranged in the same door, the output of a fifth half-bridge is connected to all first poles of the four drive elements for locking and, respectively, unlocking from the outside and the output of a sixth half-bridge is connected to all first poles of the four drive elements for locking and, respectively, unlocking from the inside.

The circuit having six half-bridges would also be particularly suitable for selectively actuating DC drive elements other than those for locking and, respectively, unlocking doors, in particular for selectively actuating four pairs of in each case two DC drive elements which are not to be operated in opposite directions at the same time. In this case, the outputs of four of the half-bridges would each have to be connected to second poles of each pair of drive elements, the output of a fifth half-bridge would have to be connected to first poles of in each case one drive element in each pair, and the output of a sixth half-bridge would have to be connected to first poles of in each case one drive element in each pair which is not to be operated in the opposite direction to the abovementioned drive element at the same time.

The drive elements can be DC motors, that is to say rotating electrical machines, possibly with a spindle for converting the rotational movement into a linear movement, but they can also be any other electromagnetic or electromechanical linear drives which operate using direct current.

In preferred embodiments, the second poles of in each case two drive elements which are arranged in the same door are connected to one another within the door.

In preferred embodiments, each half-bridge has two semiconductor switches. As an alternative, each half-bridge could be formed by a corresponding relay.

Exemplary embodiments will be described below with reference to the drawings. In the drawings.

Figure 1A:
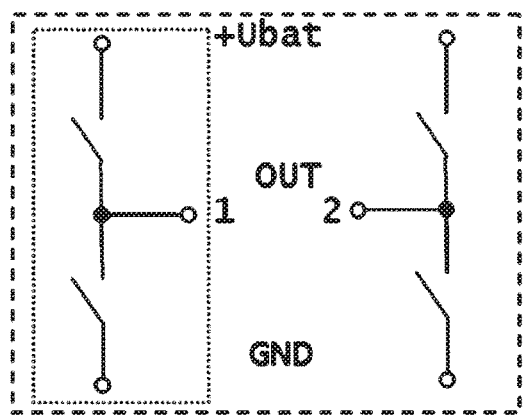
FIG. 1A shows a circuit diagram of an H-bridge circuit comprising two half-bridges.

FIG. 1A is a circuit diagram of an H-bridge circuit comprising two half-bridges, wherein the H-bridge circuit is bordered by a dashed line, and wherein one of the half-bridges is bordered by a dotted line. The H-bridge circuit has two outputs (OUT) 1 and 2 which each form part of a half-bridge and which each, depending on their switching state, supply either, for example, battery voltage (+Ubat) or, for example, ground potential (GND), so that the outputs 1 and 2 can be at the same potential or at opposite potentials depending on the actuation of the two half-bridges.

Figure 1B:
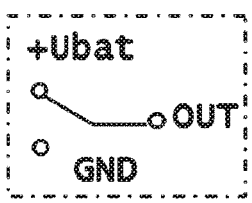
FIG. 1B shows a circuit diagram of a relay as an equivalent to a half-bridge comprising two semiconductor switches.

Each half-bridge in FIG. 1A typically consists of two semiconductor switches, but each half-bridge could also be formed by a relay, as illustrated in FIG. 1B within a dash-and-dot line.

Figure 2:
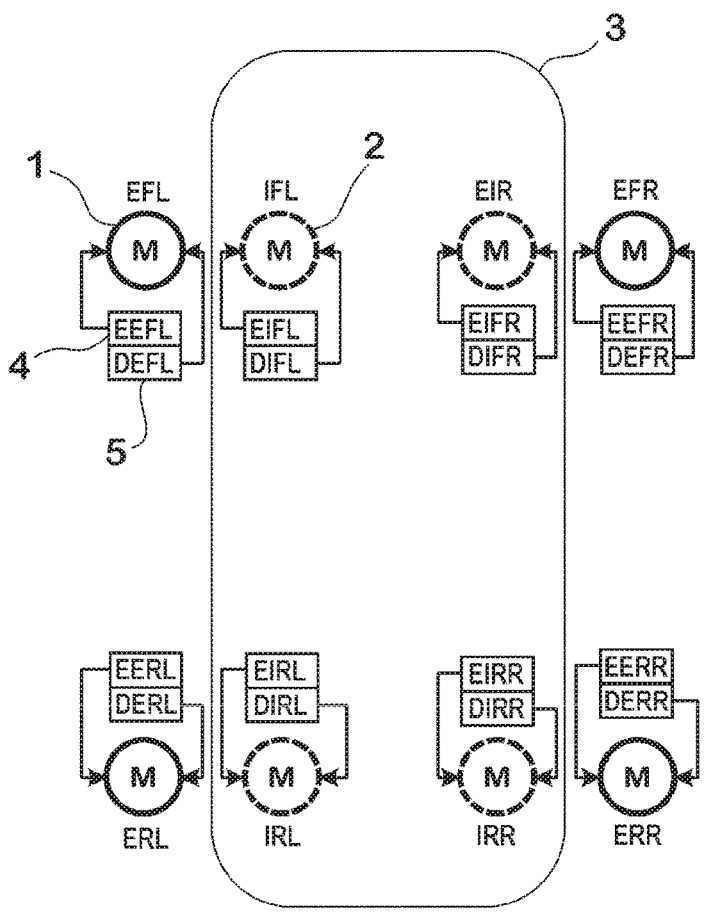
FIG. 2 shows a circuit for actuating eight motors in four side doors of a motor vehicle comprising sixteen half-bridges.
Figure 3:
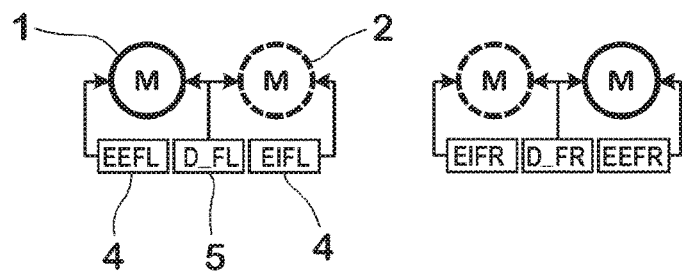
FIG. 3 shows a circuit for actuating eight motors in four side doors of a motor vehicle comprising twelve half-bridges.
Figure 4:
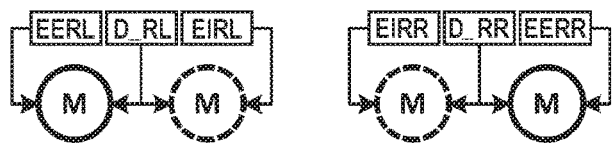
FIG. 4 shows a circuit for actuating eight motors in four side doors of a motor vehicle comprising eleven half-bridges.
Figure 4:
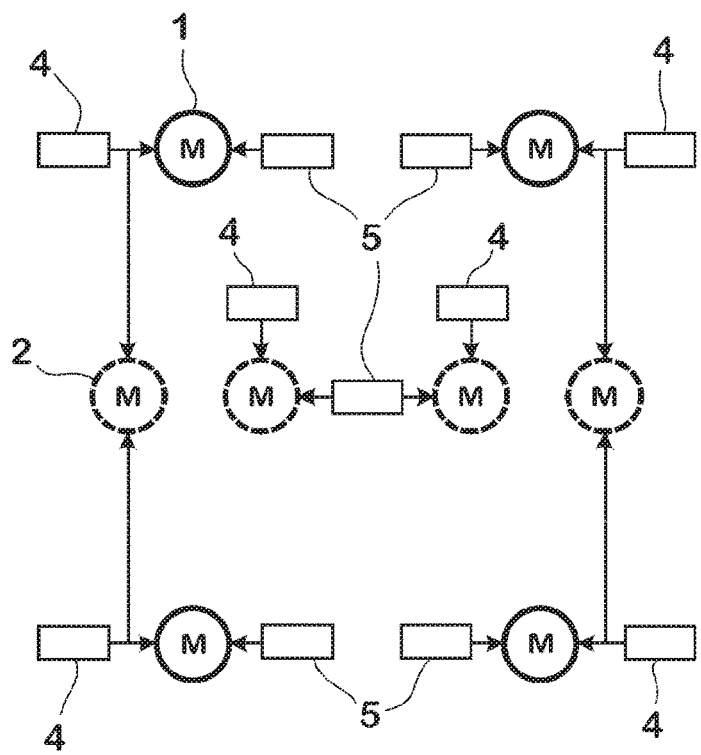

FIGS. 2 to 4 show different circuits for actuating eight DC motors in four side doors of a motor vehicle by means of half-bridges. These circuits serve for better understanding of the invention, but do not form part of the subject matter of said invention.

In FIG. 2, a motor 1 for locking and unlocking the doors from the outside and also a motor 2 for locking and unlocking the doors from the inside are located in each side door of a motor vehicle. For easier distinction, the motors 1 are drawn as solid rings, and the motors 2 are drawn as dashed rings.

Each motor 1 and 2 is additionally labeled with a sequence of three letters which indicate the position and, respectively, function of the motor 1 or 2, specifically a first letter "E" for "Exterior" or "I" for "Interior", a second letter "F" for "Front" or "R" for "Rear" and a third letter "L" for "Left" or "R" for "Right".

The position assignment is approximately also reflected in the arrangement of the motors 1 and 2 relative to one another and with respect to a motor vehicle which is illustrated only in FIG. 2 and only as outline 3, wherein the outline 3 corresponds to a plan view of a motor vehicle from above, the front of said motor vehicle pointing upward in the figure.

In the non-optimized conventional layout of FIG. 2, each of the two poles of each motor 1 and 2 is connected to the output of a dedicated half-bridge 4 and, respectively, 5, wherein each half-bridge is illustrated as a rectangle, and wherein in each case two half-bridges 4 and 5, which form part of the same motor 1, 2, are drawn adjoining one another and together form an H-bridge circuit.

Each half-bridge 4, 5 is additionally labeled with a sequence of four letters, the first of which indicates the function of the respective half-bridge, specifically "E" for "Enable" (releasing the door latch, that is to say permitting opening of the door) or "D" for "Disable" (blocking of the door latch, that is to say preventing opening of the door). The three following letters correspond to those which indicate the position and function of the respective motor 1 or 2.

Instead of sixteen half-bridges as in FIG. 2, it is possible to manage with only twelve half-bridges when in each case two motors in the same door are actuated by means of three half-bridges, as described in US 2011/0044669 A1.

The resulting layout is shown in FIG. 3, wherein two first poles of the motors 1 and 2 are each connected to a dedicated half-bridge 4 for releasing the door latch and wherein two second poles of the motors 1 and 2 are connected to a common half-bridge 5 for blocking the door latch, which common half-bridge is depicted between the two other half-bridges 4 in FIG. 3. The underscore in the letter designation of the respectively central half-bridge 5 means that this half-bridge 5 can have the effect that the respective door cannot be opened from the outside or cannot be opened from the inside or both, depending on how the two other half-bridges are actuated at the same time.

The layout of FIG. 3 allows independent motor control with twelve half-bridges. This is possible because it is not necessary to operate the two motors 1 and 2 in one door in opposite directions at the same time.

FIG. 4 shows a layout which can be considered to be a further development of the connection principle known from DE 10 2010 052 045 A1 used for eight motors in four side doors of a motor vehicle.

The layout of FIG. 4 allows motor control with only eleven half-bridges, but at the expense of the independence of motor operation. Each motor 1, 2 can perform unlocking operations, but motors 1 for locking and unlocking from the outside cannot be allowed to run in opposite directions at the same time since otherwise motors 2 for locking and unlocking from the inside would also move. Therefore, this layout requires reliable monitoring of the status of the switching units and successive actuation of motors by means of software since motors 1 and motors 2 cannot be moved at the same time.

Figure 5:
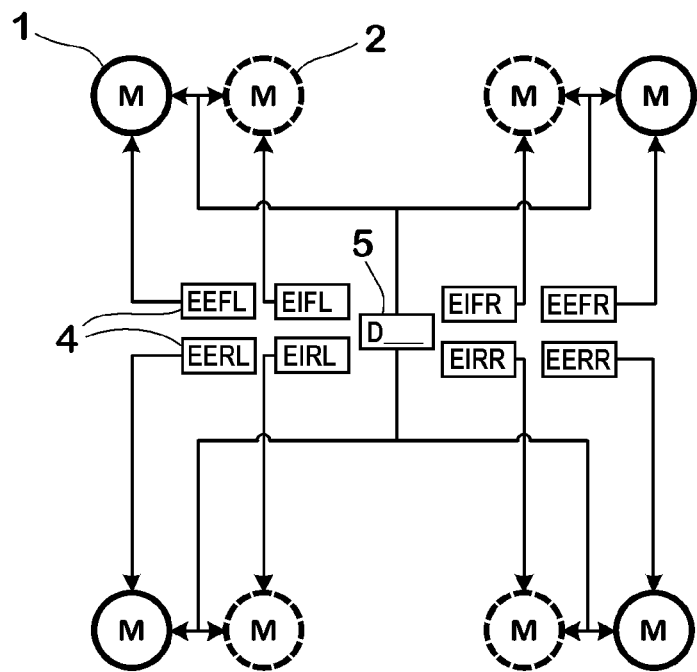
FIG. 5 shows a circuit for actuating eight motors in four side doors of a motor vehicle comprising nine half-bridges.

FIG. 5 shows a circuit for selectively actuating eight motors 1, 2 in a motor vehicle for locking and, respectively, unlocking four doors of the motor vehicle from the outside and/or from the inside with only nine half-bridges 4, 5.

In the layout of FIG. 5, each first pole of the eight motors 1 and 2 is connected to the output of a dedicated half-bridge 4 for release purposes, and all second poles of the motors 1 and 2 are connected to the output of a common ninth half-bridge 5 for blocking purposes. The underscores in the letter designation of the common half-bridge 5 mean that this half-bridge 5 can have the effect that a desired door either cannot be opened from the outside or cannot be opened from the inside or both, depending on the combination in which the eight other half-bridges are actuated at the same time.

The circuit of FIG. 5 allows independent operation of eight motors 1, 2 with only nine half-bridges 4, 5 with the only restriction that the movement direction of all motors 1, 2 is determined by the switching state of the common half-bridge 5, for which reason it is not possible to allow motors to run in different directions at the same time. However, this can be taken into account by corresponding design of the actuation software. In addition, the circuit is at any rate not less flexible than, for example, the circuit of FIG. 3 but requires significantly fewer half-bridges.

Figure 6:
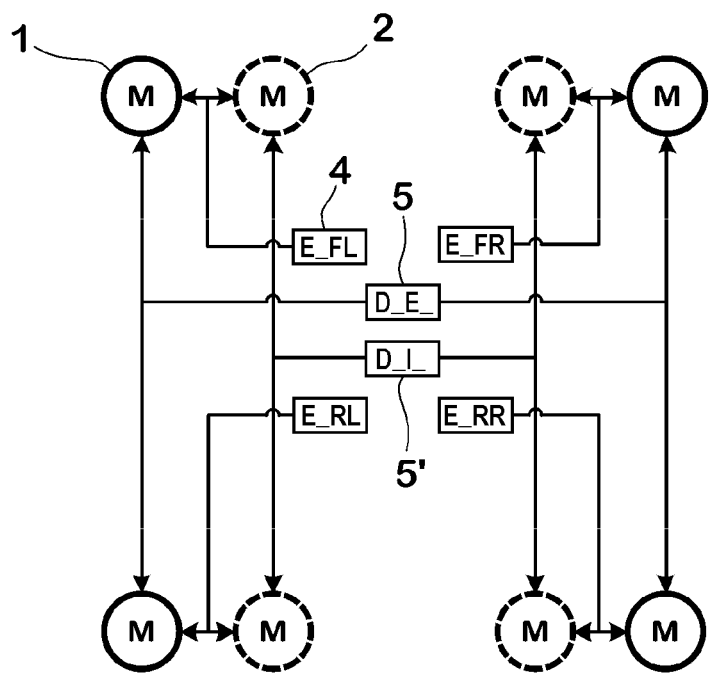
FIG. 6 shows a circuit for actuating eight motors in four side doors of a motor vehicle comprising six half-bridges.

FIG. 6 shows a circuit for selectively actuating eight motors 1, 2 in a motor vehicle for locking and, respectively, unlocking four doors of the motor vehicle from the outside and/or from the inside comprising only six half-bridges 4, 5.

In the layout of FIG. 6, the second poles of each pair of motors 1 and 2 which are arranged in the same door are each connected to the output of one of four half-bridges 4 for release purposes. All first poles of the four motors 1 for locking and unlocking from the outside are connected to the output of a fifth half-bridge 5 for blocking purposes, and all first poles of the four motors 2 for locking and unlocking from the inside are connected to the output of a sixth half-bridge 5' for blocking purposes. The last underscore in the letter designation of the half-bridges 5 and 5' means that these half-bridges 5, 5' can act on left-hand-side and/or right-hand-side doors, depending on the combination in which the other half-bridges are actuated at the same time.

The circuit of FIG. 6 is also subject to certain restrictions at the expense of flexibility and requires a more complex software architecture, but it is not less flexible than, for example, the circuit of FIG. 4 but requires significantly fewer half-bridges.

The table further below shows a scheme in accordance with which the half-bridges 4, 5 and 5' in FIG. 6 can be activated by software in order to achieve different locking states.

The possible combinations of states of the six half-bridges are listed in the left-hand-side half of the table. In said left-hand-side half of the table, logic "1" represents an active half-bridge which supplies, for example, battery voltage and moves an associated motor into the locking position if the half-bridge at the other pole of the corresponding motor is inactive (logic "0") by being connected, for example, to ground potential. Accordingly, the motor is moved into the unlocking position when the logic states are reversed.

In the right-hand-side half of the table, a "2" indicates that the associated motor, the position and function of which are indicated by a letter combination as in FIG. 2, is moved into the locking position given the combination of states of the six half-bridges indicated to the left of it. Accordingly, a "−2" indicates that the associated motor is moved into the unlocking position given the combination of states of the six half-bridges indicated to the left of it. The corresponding motor is stationary at "0".

Therefore, the circuit of FIG. 6 allows, inter alia, both front inner and outer handles to be individually released and blocked if necessary, this allowing important functions such as, for example, "unlocking of an individual door", "zonal locking of opposite doors", "locking when traffic is identified at the rear" etc.

TABLE

| State of the half-bridge | | | | | | | Locking/unlocking effect | | | | | | | |
|---|---|---|---|---|---|---|---|---|---|---|---|---|---|---|
| D_E_ | D_I_ | E_FL | E_RL | E_FR | E_RR | No. | EFL | FFR | ERL | ERR | IFL | IFR | IRL | IRR |
| 0 | 0 | 0 | 0 | 0 | 0 | 1 | 0 | 0 | 0 | 0 | 0 | 0 | 0 | 0 |
| 0 | 0 | 0 | 0 | 0 | 1 | 2 | 0 | 0 | 0 | 2 | 0 | 0 | 0 | 2 |
| 0 | 0 | 0 | 0 | 1 | 1 | 3 | 0 | 2 | 0 | 2 | 0 | 2 | 0 | 2 |
| 0 | 0 | 0 | 0 | 1 | 0 | 4 | 0 | 2 | 0 | 0 | 0 | 2 | 0 | 0 |
| 0 | 0 | 0 | 1 | 1 | 0 | 5 | 0 | 2 | 2 | 0 | 0 | 2 | 2 | 0 |
| 0 | 0 | 0 | 1 | 1 | 1 | 6 | 0 | 2 | 2 | 2 | 0 | 2 | 2 | 2 |
| 0 | 0 | 0 | 1 | 0 | 1 | 7 | 0 | 0 | 2 | 2 | 0 | 0 | 2 | 2 |
| 0 | 0 | 0 | 1 | 0 | 0 | 8 | 0 | 0 | 2 | 0 | 0 | 0 | 2 | 0 |
| 0 | 0 | 1 | 1 | 0 | 0 | 9 | 2 | 0 | 2 | 0 | 2 | 0 | 2 | 0 |
| 0 | 0 | 1 | 1 | 0 | 1 | 10 | 2 | 0 | 2 | 2 | 2 | 0 | 2 | 2 |
| 0 | 0 | 1 | 1 | 1 | 1 | 11 | 2 | 2 | 2 | 2 | 2 | 2 | 2 | 2 |
| 0 | 0 | 1 | 1 | 1 | 0 | 12 | 2 | 2 | 2 | 0 | 2 | 2 | 2 | 0 |
| 0 | 0 | 1 | 0 | 1 | 0 | 13 | 2 | 2 | 0 | 0 | 2 | 2 | 0 | 0 |
| 0 | 0 | 1 | 0 | 1 | 1 | 14 | 2 | 2 | 0 | 2 | 2 | 2 | 0 | 2 |
| 0 | 0 | 1 | 0 | 0 | 1 | 15 | 2 | 0 | 0 | 2 | 2 | 0 | 0 | 2 |
| 0 | 0 | 1 | 0 | 0 | 0 | 16 | 2 | 0 | 0 | 0 | 2 | 0 | 0 | 0 |
| 1 | 1 | 0 | 0 | 0 | 0 | 17 | −2 | −2 | −2 | −2 | −2 | −2 | −2 | −2 |
| 1 | 1 | 0 | 0 | 0 | 1 | 18 | −2 | −2 | −2 | 0 | −2 | −2 | −2 | 0 |
| 1 | 1 | 0 | 0 | 1 | 1 | 19 | −2 | 0 | −2 | 0 | −2 | 0 | −2 | 0 |
| 1 | 1 | 0 | 0 | 1 | 0 | 20 | −2 | 0 | −2 | −2 | −2 | 0 | −2 | −2 |
| 1 | 1 | 0 | 1 | 1 | 0 | 21 | −2 | 0 | 0 | −2 | −2 | 0 | 0 | −2 |
| 1 | 1 | 0 | 1 | 1 | 1 | 22 | −2 | 0 | 0 | 0 | −2 | 0 | 0 | 0 |
| 1 | 1 | 0 | 1 | 0 | 1 | 23 | −2 | −2 | 0 | 0 | −2 | −2 | 0 | 0 |
| 1 | 1 | 0 | 1 | 0 | 0 | 24 | −2 | −2 | 0 | −2 | −2 | −2 | 0 | −2 |
| 1 | 1 | 1 | 1 | 0 | 0 | 25 | 0 | −2 | 0 | −2 | 0 | −2 | 0 | −2 |
| 1 | 1 | 1 | 1 | 0 | 1 | 26 | 0 | −2 | 0 | 0 | 0 | −2 | 0 | 0 |
| 1 | 1 | 1 | 1 | 1 | 1 | 27 | 0 | 0 | 0 | 0 | 0 | 0 | 0 | 0 |
| 1 | 1 | 1 | 1 | 1 | 0 | 28 | 0 | 0 | 0 | −2 | 0 | 0 | 0 | −2 |
| 1 | 1 | 1 | 0 | 1 | 0 | 29 | 0 | 0 | −2 | −2 | 0 | 0 | −2 | −2 |
| 1 | 1 | 1 | 0 | 1 | 1 | 30 | 0 | 0 | −2 | 0 | 0 | 0 | −2 | 0 |
| 1 | 1 | 1 | 0 | 0 | 1 | 31 | 0 | −2 | −2 | 0 | 0 | −2 | −2 | 0 |
| 1 | 1 | 1 | 0 | 0 | 0 | 32 | 0 | −2 | −2 | −2 | 0 | −2 | −2 | −2 |
| 0 | 1 | 1 | 0 | 0 | 0 | 33 | 2 | 0 | 0 | 0 | −2 | −2 | −2 | −2 |
| 0 | 1 | 1 | 0 | 0 | 1 | 34 | 2 | 0 | 0 | 2 | 0 | −2 | −2 | 0 |
| 0 | 1 | 1 | 0 | 1 | 1 | 35 | 2 | 2 | 0 | 2 | 0 | 0 | −2 | 0 |
| 0 | 1 | 1 | 0 | 1 | 0 | 36 | 2 | 2 | 0 | 0 | 0 | 0 | −2 | −2 |
| 0 | 1 | 1 | 1 | 1 | 0 | 37 | 2 | 2 | 2 | 0 | 0 | 0 | 0 | −2 |
| 0 | 1 | 1 | 1 | 1 | 1 | 38 | 2 | 2 | 2 | 2 | 0 | 0 | 0 | 0 |
| 0 | 1 | 1 | 1 | 0 | 1 | 39 | 2 | 0 | 2 | 2 | 0 | −2 | 0 | 0 |
| 0 | 1 | 1 | 1 | 0 | 0 | 40 | 2 | 0 | 2 | 0 | 0 | −2 | 0 | −2 |
| 0 | 1 | 0 | 1 | 0 | 0 | 41 | 0 | 0 | 2 | 0 | −2 | −2 | 0 | −2 |
| 0 | 1 | 0 | 1 | 0 | 1 | 42 | 0 | 0 | 2 | 2 | −2 | −2 | 0 | 0 |
| 0 | 1 | 0 | 1 | 1 | 1 | 43 | 0 | 2 | 2 | 2 | −2 | 0 | 0 | 0 |
| 0 | 1 | 0 | 1 | 1 | 0 | 44 | 0 | 2 | 2 | 0 | −2 | 0 | 0 | −2 |
| 0 | 1 | 0 | 0 | 1 | 0 | 45 | 0 | 2 | 0 | 0 | −2 | 0 | −2 | −2 |
| 0 | 1 | 0 | 0 | 1 | 1 | 46 | 0 | 2 | 0 | 2 | −2 | 0 | −2 | 0 |
| 0 | 1 | 0 | 0 | 0 | 1 | 47 | 0 | 0 | 0 | 2 | −2 | −2 | −2 | 0 |
| 0 | 1 | 0 | 0 | 0 | 0 | 48 | 0 | 0 | 0 | 0 | −2 | −2 | −2 | −2 |
| 1 | 0 | 1 | 0 | 0 | 0 | 49 | 0 | −2 | −2 | −2 | 2 | 0 | 0 | 0 |
| 1 | 0 | 1 | 0 | 0 | 1 | 50 | 0 | −2 | −2 | 0 | 2 | 0 | 0 | 2 |
| 1 | 0 | 1 | 0 | 1 | 1 | 51 | 0 | 0 | −2 | 0 | 2 | 2 | 0 | 2 |
| 1 | 0 | 1 | 0 | 1 | 0 | 52 | 0 | 0 | −2 | −2 | 2 | 2 | 0 | 0 |
| 1 | 0 | 1 | 1 | 1 | 0 | 53 | 0 | 0 | 0 | −2 | 2 | 2 | 2 | 0 |
| 1 | 0 | 1 | 1 | 1 | 1 | 54 | 0 | 0 | 0 | 0 | 2 | 2 | 2 | 2 |
| 1 | 0 | 1 | 1 | 0 | 1 | 55 | 0 | −2 | 0 | 0 | 2 | 0 | 2 | 2 |
| 1 | 0 | 1 | 1 | 0 | 0 | 56 | 0 | −2 | 0 | −2 | 2 | 0 | 2 | 0 |
| 1 | 0 | 0 | 1 | 0 | 0 | 57 | −2 | −2 | 0 | −2 | 0 | 0 | 2 | 0 |
| 1 | 0 | 0 | 1 | 0 | 1 | 58 | −2 | −2 | 0 | 0 | 0 | 0 | 2 | 2 |
| 1 | 0 | 0 | 1 | 1 | 1 | 59 | −2 | 0 | 0 | 0 | 0 | 2 | 2 | 2 |
| 1 | 0 | 0 | 1 | 1 | 0 | 60 | −2 | 0 | 0 | −2 | 0 | 2 | 2 | 0 |
| 1 | 0 | 0 | 0 | 1 | 0 | 61 | −2 | 0 | −2 | −2 | 0 | 2 | 0 | 0 |
| 1 | 0 | 0 | 0 | 1 | 1 | 62 | −2 | 0 | −2 | 0 | 0 | 2 | 0 | 2 |
| 1 | 0 | 0 | 0 | 0 | 1 | 63 | −2 | −2 | −2 | 0 | 0 | 0 | 0 | 2 |
| 1 | 0 | 0 | 0 | 0 | 0 | 64 | −2 | −2 | −2 | −2 | 0 | 0 | 0 | 0 |

The invention claimed is:

1. A circuit for actuating drive elements operated on direct current using half-bridges in a motor vehicle, the circuit comprising:

eight drive elements each comprising a first pole and a second pole, wherein the eight drive elements are configured to lock and unlock four doors of the motor vehicle from outside and/or inside the motor vehicle, wherein each of the four doors of the motor vehicle comprise a pair of the eight drive elements, wherein each pair of the eight drive elements comprises a drive element configured to lock and unlock a door of the motor vehicle from outside the motor vehicle and a drive element configured to lock and unlock a door of the motor vehicle from inside the motor vehicle; and six half-bridges each comprising outputs, wherein the outputs of four of the six half-bridges are connected to second poles of the pair of drive elements that are arranged in the same door, wherein the output of a fifth half-bridge of the six half-bridges is connected to the first poles of the drive elements for locking and unlocking a door from outside the motor vehicle, and wherein the output of a sixth half-bridge of the six half-bridges is connected to the first poles of the drive elements for locking and unlocking a door from inside the motor vehicle.

2. The circuit as claimed in claim 1, wherein the eight drive elements comprise DC motors or electromagnetic or electromechanical linear drives which are configured to operate using the direct current.

3. The circuit as claimed in claim 1, wherein the second poles of two drive elements of the eight drive elements are arranged in a same door and are connected to one another within the same door.

4. The circuit as claimed in claim 1, wherein each of the six half-bridges have two semiconductor switches.

* * * * *